(12) United States Patent
Bagnall

(10) Patent No.: US 6,834,790 B2
(45) Date of Patent: Dec. 28, 2004

(54) FRICTION WELDING

(75) Inventor: Alexander J Bagnall, Huntingdon (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/411,331

(22) Filed: Apr. 11, 2003

(65) Prior Publication Data

US 2003/0197049 A1 Oct. 23, 2003

(30) Foreign Application Priority Data

Apr. 20, 2002 (GB) .............................................. 0209048

(51) Int. Cl.$^7$ .............................................. B23K 20/12
(52) U.S. Cl. ....................... 228/112.1; 228/2.1; 228/219
(58) Field of Search .............................. 228/112.1, 113, 228/114, 114.5, 2.1, 2.3, 219, 42

(56) References Cited

U.S. PATENT DOCUMENTS 3,853,258 A * 12/1974 Louw et al. .................. 228/2.3
5,321,228 A * 6/1994 Krause et al. ......... 219/121.84
6,199,744 B1    3/2001 Schneefeld
6,637,642 B1 * 10/2003 Lingnau ................... 228/112.1
2003/0197049 A1 * 10/2003 Bagnall .................... 228/112.1

FOREIGN PATENT DOCUMENTS

| DE | 003401078 C1 | * | 5/1985 |
| FR | 2760985 A | | 9/1998 |
| JP | 363317268 A | * | 12/1988 |
| JP | 7100669 A | | 4/1995 |

* cited by examiner

Primary Examiner—Kiley S. Stoner
(74) Attorney, Agent, or Firm—W. Warren Taltavull; Manelli, Denison & Selter PLLC

(57) ABSTRACT

Blades (20) are friction welded onto a disc (10) to form an integrally bladed rotor. To prevent the formation of defects in the weld interface between the blades (20) and the disc (10) a shielding gas is used. The shielding gas is introduced via two nozzles (22,24). The nozzles (22,24) are circumferentially spaced apart and located on opposite sides of the weld interface. The two gas flows oppose one another to create a curtain of gas, which flows around the weld interface. The gas curtain shields the weld interface from air and so reduces the formation of defects due to oxidation.

12 Claims, 4 Drawing Sheets

FRICTION WELDING

FIELD OF THE INVENTION

The present invention relates to friction welding and in particular to the use of a shielding gas in the friction welding process.

BACKGROUND OF THE INVENTION

Friction welding is used in the manufacture or repair of components such as integrally bladed rotor assemblies. Separately made blades are attached to the periphery of a disc or drum by their roots. The disc or drum is held stationary whilst the blades are reciprocated under pressure to develop the necessary weld temperature.

Friction welding is generally less susceptible to oxidation defects than conventional welding processes. The relative movement between the components prevents the ingress of ambient air into the weld and any oxides are transported away by the extruded material. Nevertheless defects have been discovered in the edge and corner regions of the weld, which could affect the integrity of the weld.

To prevent the formation of defects in the edge and corner regions of the weld it is known to use a shielding gas. French patent number 2 760 985 B1 discloses flowing a shielding gas through orifices in a nozzle to drive away oxygen. The nozzle is shaped to envelop the blade being welded onto a disc. A problem with this arrangement is that the nozzle extends into the weld area where space is restricted.

SUMMARY OF THE INVENTION

The present invention seeks to provide an improved method of friction welding in which a shielding gas envelops the weld area without the need for a shaped nozzle that extends into the weld area.

According to the present invention a method of friction welding workpieces together at an interface comprises the steps of holding a first workpiece in a fixed relationship to a second workpiece, oscillating the second workpiece with respect to the first workpiece, applying a load between the first and second workpieces so as to generate a temperature at the interface between the workpieces which is sufficient to weld the workpieces together, introducing opposing flows of a shielding gas on opposite sides of the interface to produce a continuous flow of shielding gas around the interface.

Preferably the opposing flows of shielding gas are introduced at an angle to the interface. The opposing flows of shielding gas are introduced through primary nozzles, which are spaced apart. The primary nozzles may be conical to diffuse the shielding gas and prevent turbulence. The primary nozzles introduce the shielding gas at a flow rate of the order of 40–150 liters/minute.

In a further embodiment of the present intention secondary nozzles are provided to direct a further flow of shielding gas towards the primary nozzles. The secondary nozzles introduce the shielding gas at a flow rate of the order of 25 liters/minute.

Preferably the shielding gas is an inert gas such as argon.

In the preferred embodiment of the present invention the first and second workpieces are preferably a disc and a blade of a rotor assembly.

A gas chamber may be created around the weld interface, which is partially sealed. In the preferred embodiment of the present invention the blades adjacent the weld interface define the partially sealed chamber.

BRIEF DESCRIPTION OF THE DRAWINGS

The present invention will now be described with reference to the accompanying figures in which.

DETAILED DESCRIPTION OF THE INVENTION

Figure 1:
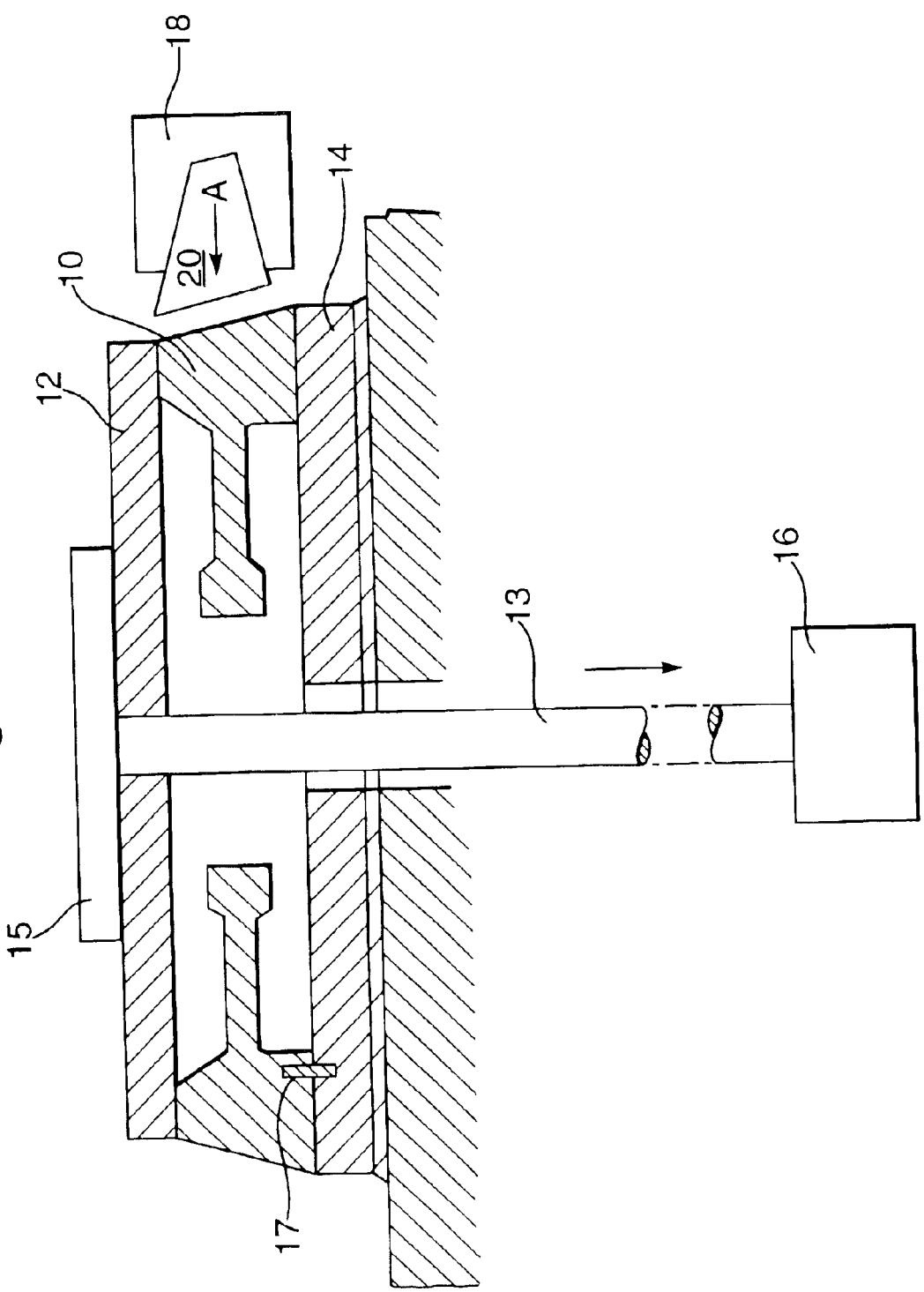
FIG. 1 shows apparatus suitable for friction welding blades onto a rotor disc.

Referring to FIG. 1 a disc 10 is held between an upper clamp member 12 and a lower clamp member 14. An axial compression force is applied between the clamp members 12 and 14 to hold the disc 10 in a fixed relationship during friction welding.

In the arrangement shown in FIG. 1 an elongate rigid member, in the form of a pull rod 13, extends axially and provides the axial compression force between the clamp members 12 and 14. A mechanism 16 generates the clamp force on the pull rod 13. The pull rod 13 has a head 15 adapted to urge the upper clamp member 12 downwards towards the lower camp member 14 to grip the disc 10.

A pin 17 is used to key the lower clamp member 14. The lower clamp member 14 can then be indexed between allowable orientations relative to the welding station 16.

The upper and lower clamp members 12 and 14 carry the disc 10 and can be indexed around so that further workpieces, such as blades 20, can be attached at different positions on the periphery of the disc 10 by the welding station 18.

A blade 20 is mounted in a component holder on the welding station 18. The blade 20 is oscillated with respect to the disc 10 whilst a weld generating force is applied in a generally radial direction as indicated by arrow A. Temperatures are generated at the interface between the disc 10 and the blade 20, which are sufficient to weld them together. A number of blades 20 are friction welded to the periphery of the disc 10 to form an integral structure called a blisk. It is envisaged that component discs 10 could be welded together to form a drum to which the blades 20 could be subsequently attached. Thus the arrangement described may be used to clamp either a single disc 10 or a drum assembly (not shown).

To minimise defects due to oxidation a shielding gas is introduced at the weld interface. The shielding gas is an inert gas, such as argon.

Figure 2:
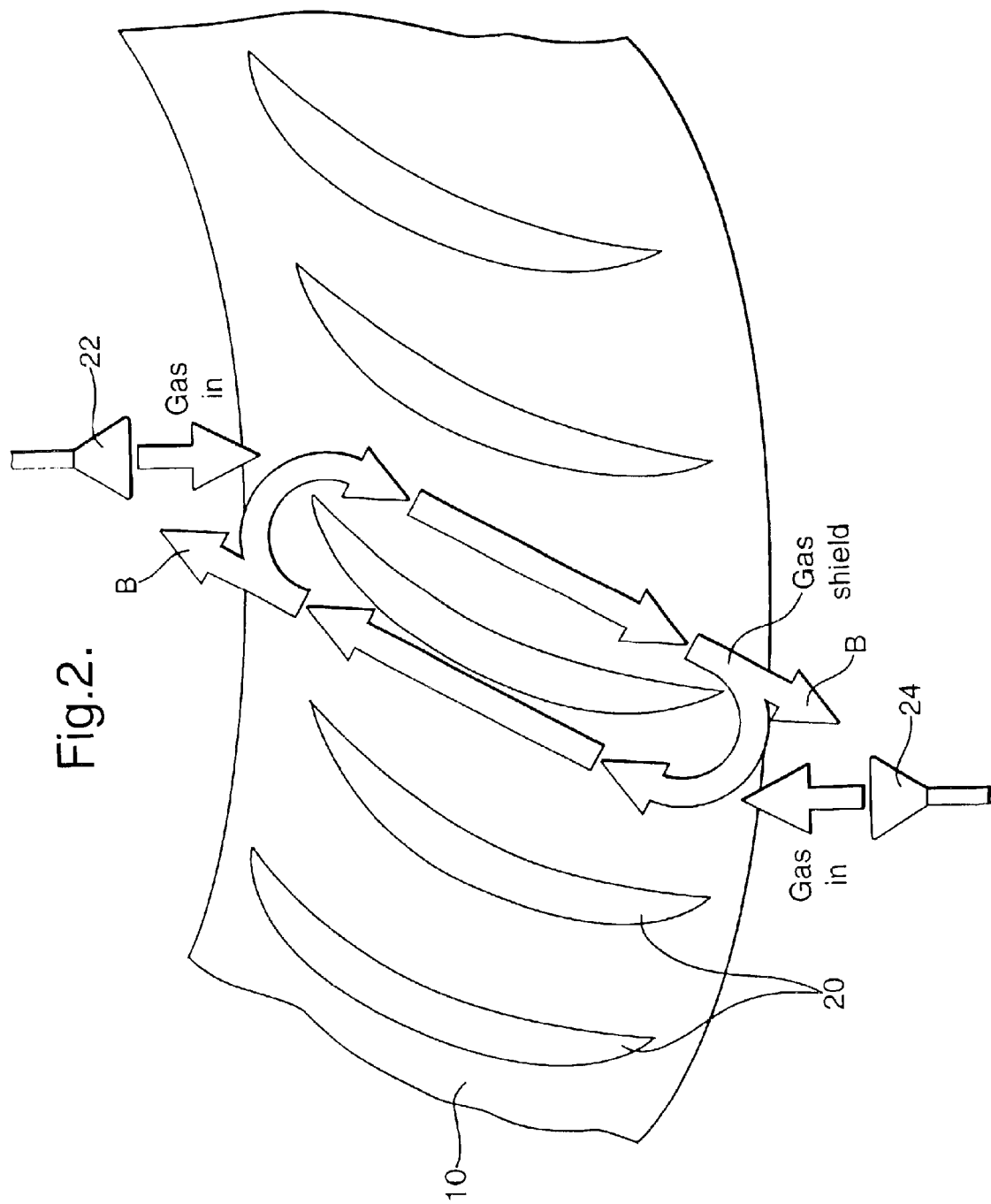
FIG. 2 is a pictorial view of part of a rotor disc showing the flow of a shielding gas introduced in accordance with one embodiment of the present invention.
Figure 3:
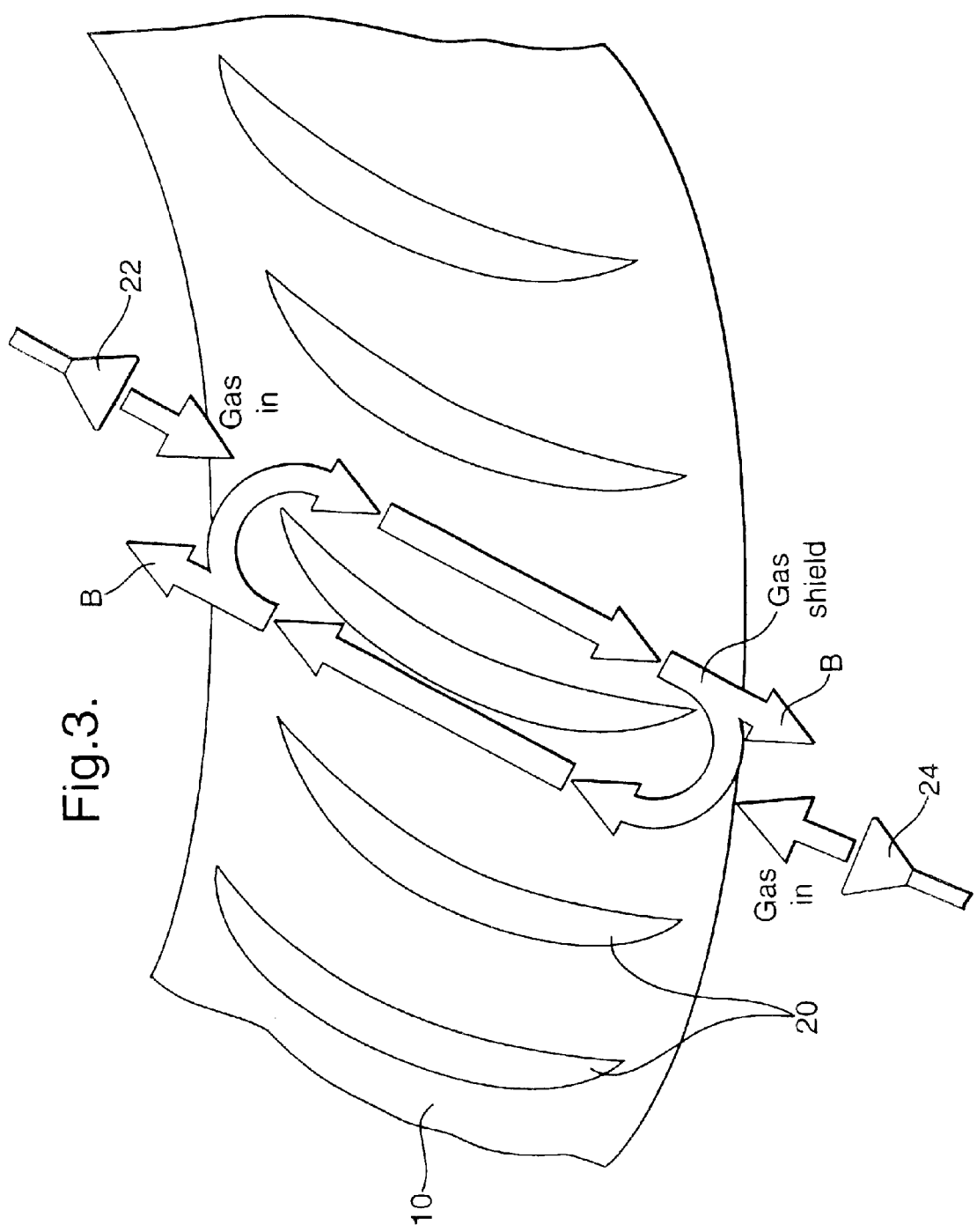
FIG. 3 is a pictorial view of part of a rotor disc showing the flow of shielding gas introduced at an angle in accordance with a second embodiment of the present invention.

In the embodiments shown in FIGS. 2 and 3, opposing flows of argon are introduced through two primary nozzles 22 and 24. The primary nozzles 22 and 24 are circumferentially spaced apart and are located on opposite sides of the weld interface. The two opposing gas flows create a gas curtain, shown by the arrows in FIGS. 1 and 3, which flows around the weld interface. The gas curtain shields the weld interface from air and so reduces the formation of defects due to oxidation.

The primary nozzles 22 and 24 may introduce the gas flow in a generally axial direction as shown in FIG. 2 or at an angle as shown in FIG. 3.

To maintain the effectiveness of the shielding gas curtain the flow must be laminar. The opposing shielding gas flows are therefore introduced at a low velocity and a high flow rate to reduce turbulence. In embodiments of the present invention shown in FIGS. 2 and 3 the primary nozzles 22 and 24 are conical and filled with wire wool. The conical nozzles 22 and 24 act as diffusers to reduce the velocity of the shielding gas and prevent turbulence. The gas flow rate, from each of the primary nozzles 22, 24, is of the order of 40 liters/minute.

As the shielding gas exits from the primary nozzles 22 and 24 oxygen could be drawn into it from the surrounding ambient air. This is prevented by shielding the primary nozzles 22 and 24 with part of the gas curtain. The part of the gas curtain indicated by the arrows B flows over the primary nozzles 22 and 24 prevents the ingress of oxygen from the ambient air.

Figure 4:
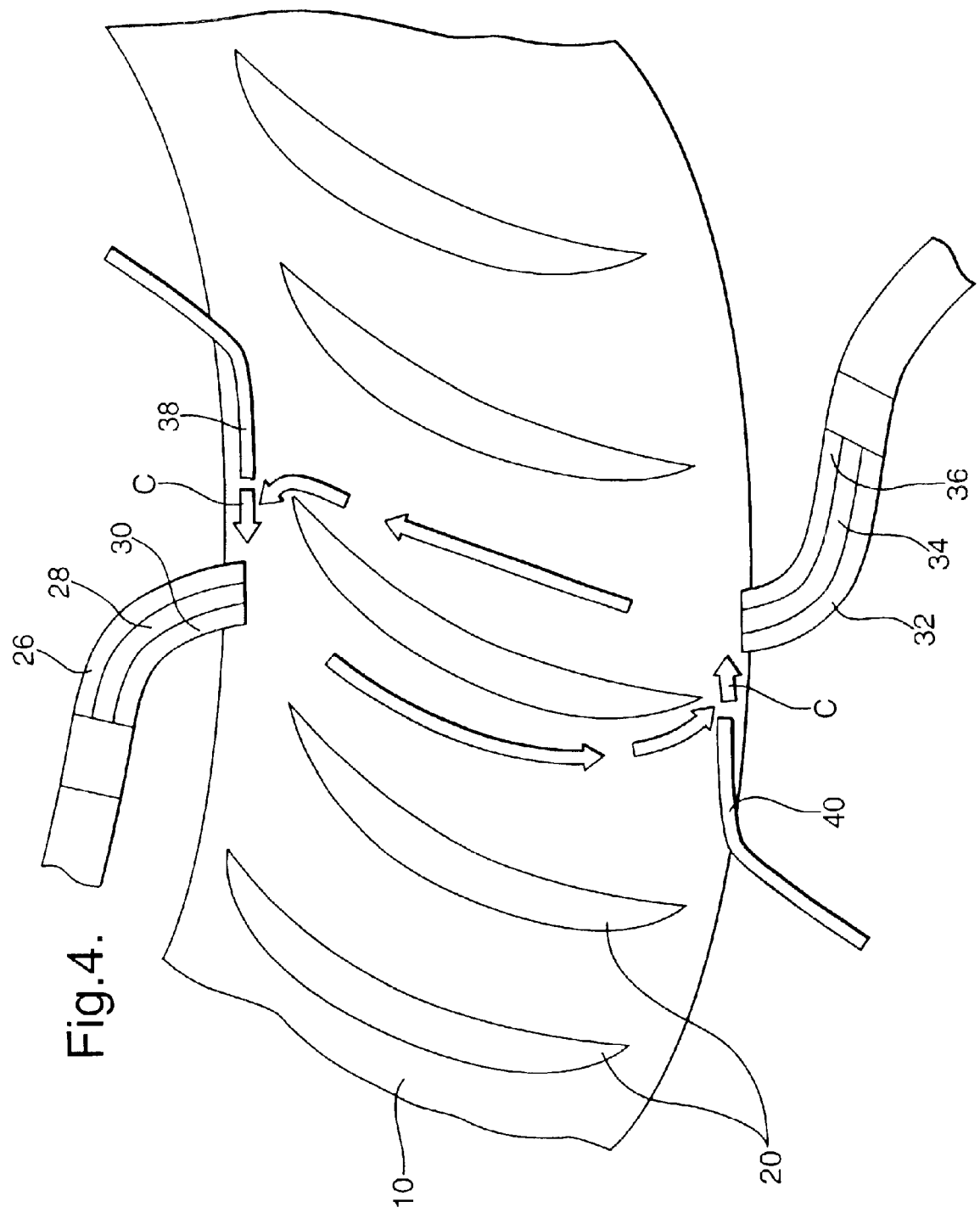
FIG. 4 is a pictorial view of part of a rotor disc showing the flow of wielding gas through a plurality of nozzles in accordance with a further embodiment of the present invention.

FIG. 4 shows a further embodiment of the present invention in which the shielding gas is introduced through primary nozzles 26–36 and secondary nozzles 38,40.

Three primary nozzles 26,28,30 are located on one side of the weld interface and three further primary nozzles 32,34, 36 are located on the opposite side of the weld interface. It will however be appreciated by one skilled in the art that any number of primary nozzles could be used depending upon the particular welding application.

The secondary nozzles 38,40 introduce a backing flow of shielding gas in the direction of arrows C. The backing flow is directed towards the primary nozzles 26–36. The secondary nozzles 38,40 are located adjacent the extremities of the weld interface and encourage the shielding gas from the primary nozzles 26–36 to flow around the extremities of the weld interface. The backing flow from the secondary nozzles 38,40 thus ensures adequate shielding at the weld extremities. The backing flow from the secondary nozzles 38,40 also further shields the primary nozzles 26–36 from the ingress of ambient air.

In the preferred embodiment of the present invention the secondary nozzles 38,40 introduce the backing flow at a flow rate of the order of 25 litres/minute.

In the embodiments shown, blades 20 are fastened either side of the blade to be friction welded. The adjacent blades define a partially sealed gas chamber around the weld interface. The gas chamber defined by the adjacent blades helps to maintain the gas-shielding curtain around the weld interface.

It will however be appreciated by one skilled in the art that other means may be used to define an appropriate gas chamber and that the gas chamber may be fully or partially sealed.

What is claimed is:

1. A method of friction welding workpieces together at an interface having extremities at either end thereof comprising the steps of holding a first workpiece in a fixed relationship to a second workpiece, oscillating the second workpiece with respect to the first workpiece, applying a load between the first and second workpieces so as to generate a temperature at the interface between the workpieces which is sufficient to weld the workpieces together, introducing opposing flows of a shielding gas through primary nozzles located at the extremities of the interface, at least one primary nozzle being provided at each end of the interface, the primary nozzle being provided at each end of the interface, the primary nozzles at either end being spaced apart to provide the opposing flows on opposite sides of the interface, each of the opposing flows passing around the extremities of the interface to produce a continuous flow of shielding gas around the interface.

2. A method of friction welding as claimed in claim 1 in which the opposing flows of the shielding gas are introduced at an angle to the weld interface.

3. A method of friction welding as claimed in claim 1 in which the primary nozzles are conical.

4. A method of friction welding as claimed in claim 1 in which the opposing flows of shielding gas are introduces at a rate of the order of 40–150 litres/minute.

5. A method of friction welding workpieces together at an interface comprising the steps of holding a first workpiece in a fixed relationship to a second workpiece, oscillating the second workpiece with respect to the first workpiece, applying a load between the first and second workpieces so as to generate a temperature at the interface between the workpieces which is sufficient to weld the workpieces together, introducing opposing flows of a shielding gas on opposite sides of the interface to produce a continuous flow of shielding gas around the interface and in which the opposing flows of the shielding gas are introduced through primary nozzles that are spaced apart and in which secondary nozzles are provided to direct a further flow of shielding gas towards the primary nozzles.

6. A method of friction welding as claimed in claim 5 in which the secondary nozzles introduce a flow of shielding gas at a rate on the order of 25 litres/minute.

7. A method of friction welding as claimed in claim 1 in which the first and second workpieces are a disc and a blade of a rotor assembly.

8. A method of friction welding as claimed in claim 1 in which a gas chamber is created around the weld interface.

9. A method of friction welding as claimed in claim 8 in which the gas chamber is partially sealed.

10. A method of friction welding as claimed in claim 7 in which a gas chamber is defined by the blades adjacent the weld interface.

11. A method of friction welding as claimed in claim 1 in which the shielding gas is inert.

12. A method of friction welding as claimed in claim 11 in which the shielding gas is argon.

* * * * *